INVENTORS
RAYMOND L. CURCI
ROBERT E. SMITH
BY William P. Lane
ATTORNEY

UNITED STATES PATENT OFFICE 2,692,582

MAGNETIC FLUID VALVE

Raymond L. Curci, Hawthorne, and Robert E. Smith, Downey, Calif., assignors to North American Aviation, Inc.

Application July 5, 1949, Serial No. 103,082

7 Claims. (Cl. 121—38)

This invention pertains to fluid valves and particularly to a valve capable of controlling accurately the flow of fluid without the use of moving elements.

It is an object of this invention to provide a fluid valve adapted to use as the fluid medium a suspension of carbonyl iron particles in oil.

It is a further object of this invention to provide a fluid valve having no moving parts.

It is another object of this invention to provide a fluid valve which is electrically controlled.

It is a further object of this invention to provide an electrically controlled fluid valve having a linear relationship between the electric current used to control the valve and the flow through the valve.

It is a further object of this invention to provide a fluid valve with an extremely low response time.

It is a further object of this invention to provide an electrically controlled fluid valve having no moving parts.

It is still another object of this invention to provide electrically controlled valve means for actuating a hydraulic cylinder.

Other objects of invention will become apparent from the following description taken in connection with the accompanying drawing, in which.

Figure 2:
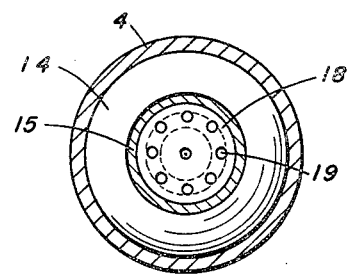
Fig. 2 is a partial sectional view taken at 2—2 of Fig. 1.

Referring to the drawing a hydraulic cylinder 1 having a piston 2 and a piston rod 3 is shown connected to valve bodies 4 and 5 via conduits 6, 7, 8, and 9. Valve body 4 is shown in section while valve body 5 is shown in elevation but it is to be understood that valve body 5 is identical with valve body 4. High pressure hydraulic fluid in which carbonyl iron particles are suspended is furnished via conduits 10 and 11. Conduits 12 and 13 serve to return the fluid to a pump (not shown) which furnishes the high pressure. A solenoid 14 is shown laid around a cylindrical chamber 15 which is divided by bulkhead 16 into two separate chambers. Cores 17 and 18 having cylindrical shape are suspended within cylindrical chamber 15 so as to provide small holes 19 between them and cylindrical chamber 15, as shown in Fig. 2. When the holes are unobstructed, fluid may flow from conduit 7 to conduit 13 and from conduit 11 to conduit 8.

It is intended that a solution of oil and carbonyl iron in the proportions of approximately nine parts iron to one part oil, by weight, be used in this valve. However, any other fluid or any variations in the proportions of the preferred fluid may be used providing a response of the fluid to the magnetic field yields flow-controlling action.

Figure 1:
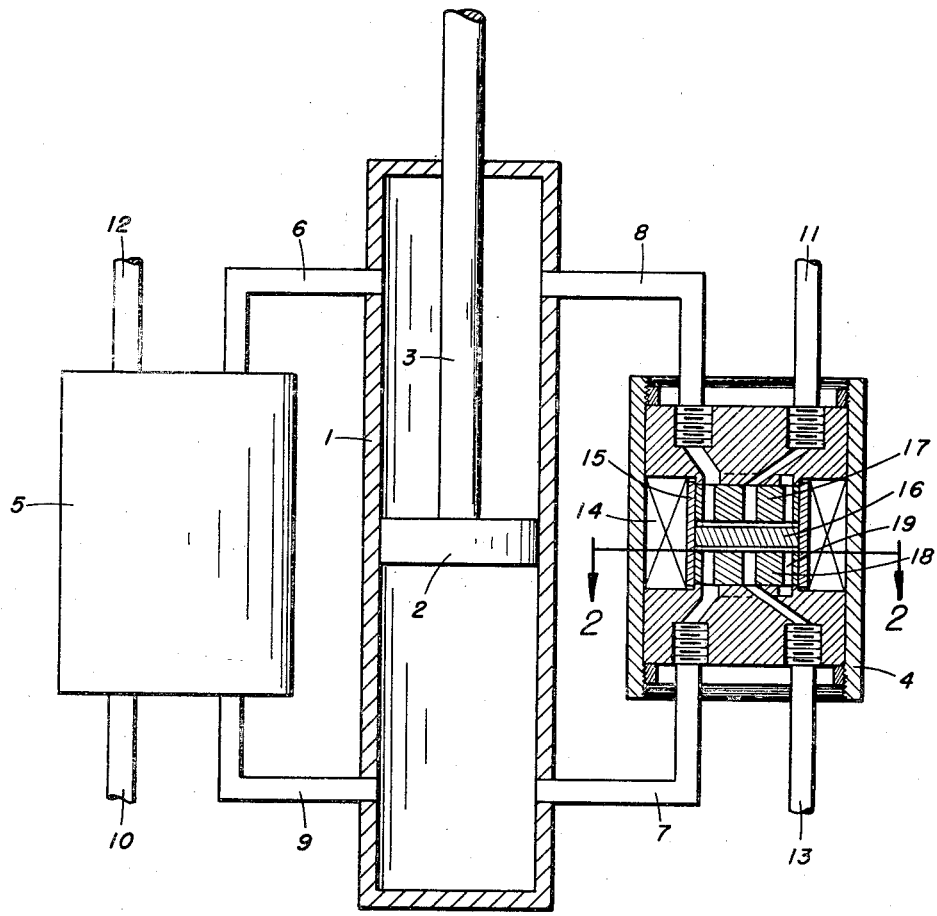
Fig. 1 is a sectional schematic view of the device.

In operation the high pressure fluid of the type hereinbefore described is furnished to conduits 10 and 11 from a recirculating pressure pump which draws fluid from conduits 12 and 13. When current is applied to solenoid 14 and no current is applied to its counterpart in valve body 5, fluid flows freely through the valve, moving piston 2 upward, as shown in Fig. 1. When it is desired to stop flow completely, both solenoids are energized equally. When a current is applied to the solenoid, flow through the restricted passages separating cores 17 and 18 from wall 16 is impeded because the iron particles in the solution become magnetized and the solution tends to solidify. By controlling the amount of current applied to the solenoid the movement of piston 2 may be accurately controlled in the upward direction. To control the movement of piston 2 in either direction the use of two valve bodies is required, as shown in Fig. 1, one to move the cylinder upward and the other to move the cylinder downward. Thus conduit 8 furnishes high pressure to the cylinder, conduit 7 provides a return from the cylinder, conduit 9 provides high pressure, and conduit 6 serves as a return. The motion of the hydraulic cylinder may be accurately controlled in speed and direction. In addition, the flow of fluid may be absolutely halted by the application of equal current in both valve bodies. When current is applied to both valve bodies the fluid in both valve bodies, and especially in the holes between cores 17 and 18 and bulkhead 16, is frozen, preventing any flow whatsoever.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for controlling the flow of hydraulic fluid in which magnetic particles are suspended comprising a cylindrical chamber, a bulkhead separating said cylindrical chamber into two substantially equal compartments, a magnetic core in each of said compartments smaller than said cylinder, conduit means for furnishing said fluid to the areas between said cores and said bulkhead, and solenoid means surrounding the foregoing means whereby the flow of fluid through said conduit means is indirectly proportional to the flow of current in said solenoid.

2. Means for controlling the flow of hydraulic fluid in which magnetic particles are suspended comprising conduit means having a passage of substantially uniform thickness in at least one direction for conducting the flow of said fluid, means for providing a uniformly distributed magnetic field in said passage in said direction of uniform thickness, and means for varying said magnetic field whereby the flow in said conduit is inversely proportional to the strength of said field.

3. Means for controlling the flow of hydraulic fluid in which magnetic particles are suspended comprising conduit means having a passage of substantially uniform thickness in at least one direction for conducting the flow of said fluid, and a solenoid for producing a uniformly distributed magnetic field in said passage in said direction of uniform thickness in response to variations in the current in said solenoid whereby the rate of flow of said fluid is inversely proportional to said current.

4. Means for controlling the flow of hydraulic fluid in which magnetic particles are suspended comprising a valve body having an inlet and an outlet thereto, a flat restricted passage of substantially uniform thickness connected within said valve body between said inlet and outlet, and a solenoid around said valve body adapted to produce a uniformly distributed magnetic field in said restricted passage in said direction of uniform thickness whereby the flow of fluid through said restricted passage is inversely proportional to the current in said solenoid.

5. Means for actuating a load comprising a hydraulic cylinder having separate pressure and return ports on either side of the piston in said cylinder, two valve bodies each having two inlet and two outlet ports, conduit means within said valve bodies for connecting the inlet and outlet ports in each valve, conduit means for connecting a pressure port on one side of said piston, and a return port on the other side of said piston to an outlet and inlet port of each of said valve bodies, respectively, means for supplying hydraulic fluid which has carbonyl iron particles suspended in it to the inlet port of each valve body which connects to the pressure port of said cylinder, and solenoid means for producing a variable magnetic field in said conduit means within said valve body whereby variation in solenoid current produces variations in the motion of said piston.

6. A hydraulic actuator comprising a hydraulic cylinder having a piston movable therein and separate pressure and return ports on either side of said piston and adapted to be operated in connection with a fluid medium comprising magnetic particles suspended in a fluid, two valve bodies each having two inlet and two outlet ports, restrictive conduit means within said valve bodies for connecting the inlet and outlet ports within said valve bodies, means for connecting a pressure port on one side of said piston and return port on the other side of said piston to an outlet and an inlet port of one of said valve bodies respectively, means for connecting a pressure port on one side of said piston and return port on the other side of said piston to an outlet and an inlet port of the other of said valve bodies respectively, hydraulic fluid comprising magnetic particles suspended in a fluid, means for supplying said hydraulic fluid to the remaining inlet ports of said valve bodies under pressure, and solenoid means for producing a variable magnetic field in said restricted conduit means within said valve body so that the quantity of hydraulic fluid passing through said valve body and hence the movement of said piston is a function of the current in said solenoid means.

7. A device as recited in claim 6 in which said magnetic field is a suspension of carbonyl iron particles in hydraulic fluid having a permeability of approximately five times that of air.

References Cited in the file of this patent
UNITED STATES PATENTS

| Number | Name | Date |
|---|---|---|
| 616,211 | Taylor | Dec. 20, 1898 |
| 896,120 | Kramer | Aug. 18, 1908 |
| 1,323,301 | Mardis | Dec. 2, 1919 |
| 1,920,925 | Juchheim | Aug. 1, 1933 |
| 2,087,387 | Price | July 20, 1937 |
| 2,405,127 | Beach | Aug. 6, 1946 |
| 2,505,049 | Keller | Apr. 25, 1950 |

OTHER REFERENCES

Business Week, December 18, 1948, Article "Magnetized Iron-Oil Mixes," on pages 48 and 49.